United States Patent [19]

Wolf et al.

[11] Patent Number: 5,336,697
[45] Date of Patent: Aug. 9, 1994

[54] MOLDED CELLULAR CROSSLINKED VINYL LACTAM POLYMER GEL AND METHOD OF PREPARATION

[75] Inventors: Philip F. Wolf, Bridgewater, N.J.; Susan Y. Tseng, Staten Island, N.Y.

[73] Assignee: ISP Investments Inc., Wilmington, Del.

[21] Appl. No.: 115,529

[22] Filed: Sep. 2, 1993

Related U.S. Application Data

[62] Division of Ser. No. 104,301, Aug. 9, 1993, Pat. No. 5,280,049.

[51] Int. Cl.⁵ ................................................ C08J 9/28
[52] U.S. Cl. ...................................... 521/189; 525/283
[58] Field of Search ......................... 521/189; 525/283

[56] References Cited

U.S. PATENT DOCUMENTS 3,669,910  6/1972  English et al. .................. 521/189
3,985,540  10/1976  Fein et al. ........................ 521/142

*Primary Examiner*—Morton Foelak
*Attorney, Agent, or Firm*—Marilyn J. Maue; Joshua J. Ward

[57] ABSTRACT

This invention relates to a foamed, cellular crosslinked vinyl lactam polymer and to a formed rigid product obtained therefrom having dimensional stability and a high Tg above 150° C. The invention also relates to the method of preparing said molded cellular polymer.

10 Claims, No Drawings

MOLDED CELLULAR CROSSLINKED VINYL LACTAM POLYMER GEL AND METHOD OF PREPARATION

This is a division of application Ser. No. 08/104,301, filed Aug. 9, 1993, now U.S. Pat. No. 5,280,049.

BACKGROUND OF THE INVENTION

Crosslinked vinylpyrrolidone polymeric powder has been prepared by proliferous polymerization at high temperatures with vigorous agitation as described for example in copending patent application Ser. No. 057,378, filed May 6, 1993 for COLORLESS, PURIFIED, POLYMERIZABLE COMPOSITION USEFUL FOR THE PRODUCTION OF CROSSLINKED POLYVINYLPYRROLIDONE. U.S. Pat. Nos. 5,089,910; 5,130,388 and 5,015,708 also describe processes for crosslinking vinyl lactam polymers. However, the powder products obtained by these processes are not amenable to molding and do not possess a foamed, cellular structure.

Accordingly, it is an object of this invention to provide a crosslinked vinyl lactam polymer in the form of a cellular porous product having a high Tg (glass transition temperature) which is molded into a desired shape of high dimensional stability.

Another object of the invention is to provide a disposable shaped product having thermoinsulating properties.

Still another object is to provide an economical and commercially feasible process for preparing a molded cellular product of a crosslinked vinyl lactam polymer.

Yet another object is to provide a strong, durable, molded product having a high Tg temperature.

These and other objects of this invention will become apparent from the following description and disclosure.

THE INVENTION

The molded cellular product of this invention is achieved by
(1) forming a uniform liquid mixture of
   (a) between about 10 and about 30 wt. % of a polymerizable reactant containing at least 55% N-vinyl lactam monomer;
   (b) between about 0.01 and about 10.0 wt. % crosslinking agent;
   (c) between about 60 and about 90 wt. % solvent and
   (d) between about 0.1 and about 5 wt. % of a free radical initiator decomposition temperature below the boiling point of said solvent;
(2) introducing said mixture into a dish or mold;
(3) in the absence of agitation and in an inert atmosphere, heating the mixture to between about 50° and about 80° C. for a period of from about 1 to about 5 hours to begin polymerization without displacement of the solvent medium, and then raising the temperature to between about 100° and about 145° C. for an additional period of from about 0.5 to about 3 hours or until a constant viscosity (i.e. gel strength) is reached to complete the crosslinking of the polymer;
(4) recovering the crosslinked polymer in the form of a shaped rubbery intermediate and digesting said intermediate in water to extract and remove soluble monomer, linear polymer and other residuals in the aqueous phase;
(5) recovering a clear, formed, crosslinked vinyl lactam polymer hydrogel from water and
(6) freeze drying said hydrogel for a period of from about 2 to about 24 hours at a critical temperature of between about −85° C. and −40° C. to produce a white, cellular molded product of crosslinked an N-vinyl lactam polymer.

The preformed hydrogel of this invention is derived from the homopolymerization or copolymerization of N-vinyl pyrrolidone and/or N-vinyl caprolactam which is between about 0.01 and about 10% crosslinked, preferably between about 0.1 and about 2% crosslinked, with a suitable polyfunctional crosslinking agent.

As indicated, the N-vinyl lactam monomer may be combined with a polymerizable comonomer, preferably in an amount not more than 30%. Suitable comonomers are those which are soluble in the reaction solvent and include olefinically unsaturated compounds such as another N-vinyl amide, vinyl acetate, acrylic acid, methacrylic acid, acrylamide, methacrylamide, lower alkyl acrylates or methacrylates, isobutylene, acrylonitrile, vinyl chloride, hydroxyalkyl acrylates or methacrylates, ethyl vinyl ether, vinyl ether, quaternized dimethylamino lower alkyl acrylates or methacrylates and the like.

Representative of the polyalkenyl crosslinking agents which can be employed are diallylimidazolidone; the divinyl ether of diethylene glycol; pentaerythritol triallyl ether (PETE); triallyl-1,3,5-triazine-2,4,6-(1H,3H,5H)trione (TATT); ethylene glycol diacrylate; 2,4,6-triallyloxy-1,3,5-triazine; N-vinyl-3(E)-ethylidene pyrrolidone (EVP); 1,7-octadiene; 1,9-decadiene; divinyl benzene; methylene bis(methacrylamide); methylene bis(acrylamide); N,N-divinyl-imidazolidone; ethylene glycol diacrylate; ethylidene bis(N-vinylpyrrolidone) (EBVP); etc.

Preferred products of this invention are those derived from N-vinyl pyrrolidone homopolymer, N-vinyl pyrrolidone/N-vinyl caprolactam copolymer or N-vinyl pyrrolidone/acrylic acid copolymer which are crosslinked with EVP, EBVP or divinylimidazolidone. Most preferred is the EVP crosslinked N-vinyl pyrrolidone homopolymer.

The solvent used in the above process is water, lower alkanol e.g. $C_1$ to $C_4$ alkanol, glycerol, or a mixture thereof; although pure, deionized water is preferred. Basically, the polymer swellable solvent system. The amount of solvent employed can vary over a wide range; however, between about 65% and 75% of the reaction mixture is usually sufficient to dissolve all reactive components. If desired, a small amount, e.g. between about 0.001 and about 1.0 wt. %, of a coloring agent can be added to the solvent or to the water wash.

Suitable polymerization initiators, more often employed in a concentration of from about 0.1 to about 3 wt. %, are free radical catalysts having 10 hours half life temperature and a decomposition temperature below the boiling point of the solvent employed. Such initiators include diacyl peroxides such as diacetyl peroxide, dibenzoyl peroxide, dilauroyl peroxide; peresters such as t-butylperoxy pivalate, t-butyl peroctoate, t-amylperoxy pivalate, t-butylperoxy-2-ethyl hexanolate; percarbonates such as dicyclo hexyl peroxy dicarbonate, as well as azo compounds such as 2,2′-azobis(isobutyrolnitrile), 2,2′-azo-bis(2,4-dimethylvaleronitrite), 2,2′-azobis(cycanocyclohexane) and mixtures thereof; the organic peroxides being preferred.

The mechanical strength of the hydrogel product can be varied within an acceptable range by regulating the concentrations of reactive monomer(s) and/or crosslinking agent in the initial uniform mixture before molding. Hence, the mechanical strength varies directly with the amount of monomer and/or crosslinker in the system. Generally, a mechanical strength of from about 1 g/mm$^2$ to about 10 g/mm$^2$ is considered desirable.

The crosslinked gel obtained after saturation in from about 1 to about 500 volumes of water for a period of from about 5 hours to about 2 days, contains between about 1.8 and 50 wt. % crosslinked polymer, between about 70 to 98 wt. % water and between about 0 to about 20 wt. % of an innocuous additive or a material which is chemically inactive in the polymerization, e.g. colorant, medicinal or other ingredients suitable for particular needs.

This gel is then subjected to freeze drying at a critical temperature of between about $-85°$ C. and $-40°$ C. until a rigid, cellular product is obtained, usually within a period of from about 2 to about 70 hours. The preferred conditions of freeze drying include a temperature within the range of from about $-80°$ to about $-60°$ C. and a drying time of from 5 to 10 hours. The internal pores of the foamed cellular structure, having an average diameter of between about 1 and about 100 microns, provide heat or cold insulating properties as are desired in disposable drinking cups and thermos containers. Further, the expanded foamed cellular structure of the present product closely resembles styrofoam and has similar uses. To obtain this foamed product it is important that agitation be avoided during the molding step. Also, the speed of freezing is critical since, at a slow rate of freezing above $-40°$ C., the rigid cellular product is not obtained and drying produces a crumbled mass. Although temperatures below 31 85° C. can be employed (e.g. $-100°$ C.), inexpensive and available equipment impose a practical lower temperature for operation.

After use, the molded product can be easily crushed and disposed of conveniently as particulate building insulation or as minimum volume waste employed for land fill or other purposes. The crushed material is also useful as filtering means, e.g. for outdoor swimming pools and the like. Many other uses and applications of the present products will become apparent from this disclosure.

Having generally described the invention, reference is now had to the following examples which illustrate preferred embodiments concerning the preparation and use of the present foamed products, which examples are not to be construed as limiting to the scope of the invention as more broadly defined above and in the appended claims.

EXAMPLE 1

A homogeneous solution of 10.8354 grams of N-vinyl pyrrolidone (VP), 0.0479 gram N-vinyl-3(E)-ethylidene pyrrolidone (EVP), 42.2380 grams of distilled water and 0.1192 gram of tert-butylperoxy pivalate (LUPERSOL 11) was poured into a Petri dish and the dish placed in a temperature controlled vacuum oven under a blanket of nitrogen wherein 20–30 mm Hg was maintained. The solution in the above closed system was heated at 60° C. for 1.5 hours and then at 120° C. to 140° C. for 1.5 hours, after which the solution was allowed to cool to room temperature and the resulting rubbery product was then removed from the dish and was introduced into about 500 volumes of distilled water for 15 hours with simultaneous removal and replacement of the water until the mother liquor is free of residual monomer and soluble, non-crosslinked poly-(N-vinylpyrrolidone). During the above water digestion step, the rubbery product swelled to a clear, transparent hydrogel having a gel volume of 18 g. H$_2$O per g. of crosslinked polymer. This preshaped hydrogel product, was subjected to freeze drying at $-80°$ C. for about 15 hours after which it was allowed to warm to room temperature. The resulting rigid cellular product is a foamed, light weight, compressible crosslinked polymer which is suitable for insulation or other purposes requiring temperature insulating properties.

EXAMPLE 2

A homogeneous solution of 9.6947 grams of N-vinyl pyrrolidone (VP), 0.3103 gram of a mixture of 13.1% EVP and 84.1% VP, 40 grams of distilled water and 0.1470 gram of tert-amylperoxy pivalate (LUPERSOL 554) was poured into a Petri dish and the dish placed under a blanket of nitrogen in a temperature controlled vacuum oven wherein 20–30 mmHg was maintained. The solution in this closed system was heated at 70° C. for 2 hours and then at 120° C. for one hour, after which the solution was allowed to cool to room temperature and the resulting rubbery product was then removed from the dish and was introduced into about 450 volumes of distilled water for 15 hours with simultaneous removal and replacement of the water until the mother liquor is free of residual monomer and soluble, non-crosslinked poly-(N-vinylpyrrolidone). During the above water digestion step, the rubbery product swelled to a clear, transparent hydrogel having a gel volume of 18 g. H$_2$O per g. of crosslinked polymer. This preshaped hydrogel was then subjected to freeze drying at $-80°$ C. for 15 hours, after which it was allowed to warm to room temperature. The resulting rigid cellular product is a foamed, light weight, compressible, crosslinked polymer which is suitable for insulation or other purposes requiring temperature insulating properties.

EXAMPLE 3

A homogeneous solution of 9.2366 grams of N-vinyl pyrrolidone (VP), 0.7633 gram of a mixture of 13.1% EVP and 84.1% of VP, 40 grams of distilled water and 0.1012 gram of tert-amylperoxy pivalate (LUPERSOL 554) was poured into a Petri dish and the dish placed under a blanket of nitrogen in a temperature controlled vacuum oven wherein 20–30 mmHg was maintained. The solution in this closed system was heated at 70° C. for 2 hours and then at 120° C. for one hour, after which the solution was allowed to cool to room temperature and the resulting rubbery product was then removed from the dish and was introduced into about 450 volumes of distilled water for 15 hours with simultaneous removal and replacement of the water until the mother liquor is free of residual monomer and soluble, non-crosslinked poly-(N-vinylpyrrolidone). During the above water digestion step, the rubbery product swelled to a clear, transparent hydrogel having a gel volume of 15 g. H$_2$O per g. of crosslinked polymer. This preshaped hydrogel was then subjected to freeze drying at $-70°$ C. for 18 hours, after which it was allowed to warm to room temperature. The resulting rigid cellular product is a foamed, light weight, compressible, crosslinked polymer which is suitable for insulation or other purposes requiring temperature insulating properties.

EXAMPLE 4

A homogeneous solution of 19.0960 grams of N-vinyl pyrrolidone (VP), 0.9078 gram of a mixture of 8.85% EVP and 91.15% of VP, 80 grams of distilled water and 0.3301 gram of tert-butylperoxy pivalate (LUPERSOL 11) was prepared and introduced into 14 50 ml Pyrex beakers (7 gms. solution per beaker). The beakers were placed under a blanket of nitrogen in a temperature controlled vacuum oven wherein 20–30 mm Hg was maintained. The solution in this closed system was heated at 70° C. for 2 hours and then at 110° C. for one hour, after which the solution was allowed to cool to room temperature and the resulting rubbery products were then removed from the beakers and each introduced into about 500 volumes of distilled water for 15 hours with simultaneous removal and replacement of the water until the mother liquor is free of residual monomer and soluble, non-crosslinked poly-(N-vinyl-pyrrolidone). During the above water digestion step, the rubbery products swelled to a clear, transparent hydrogel having a gel volume of 20 g. $H_2O$ per g. of crosslinked polymer. This preshaped hydrogel was then subjected to freeze drying at $-80°$ C. for 15 hours, after which it was allowed to warm to room temperature. The resulting rigid cellular product is a foamed, light weight, compressible, crosslinked polymer which is suitable for insulation or other purposes requiring temperature insulating properties.

EXAMPLE 5

A homogeneous solution of 9.5439 grams of N-vinyl pyrrolidone (VP), 0.4541 gram of a mixture of 8.85% EVP and 91.15% VP, 90 grams of distilled water and 0.5122 gram of tert-butylperoxy pivalate (LUPERSOL 11) was prepared and introduced into 14 50 ml Pyrex beakers (7 g. solution/beaker). The beakers were placed under a blanket of nitrogen in a temperature controlled vacuum oven wherein 20–30 mm Hg was maintained. The solution in this closed system was heated at 70° C. for 2 hours and then at 110° C. for 2 hours, after which the solution was allowed to cool to room temperature and the resulting rubbery products were then removed from the beakers and each introduced into about 500 volumes of distilled water for 15 hours with simultaneous removal and replacement of the water until the mother liquor is free of residual monomer and soluble, non-crosslinked poly-(N-vinylpyrrolidone). During the above water digestion step, the rubbery products swelled to a clear, transparent hydrogel having a gel volume of 40 g. $H_2O$ per g. of crosslinked polymer. This preshaped hydrogel was then subjected to freeze drying at $-60°$ C. for 20 hours, after which it was allowed to warm to room temperature. The resulting rigid cellular product is a foamed, light weight, compressible, crosslinked polymer which is suitable for insulation or other purposes requiring temperature insulating properties.

EXAMPLE 6

A homogeneous solution of 5.4 grams of N-vinyl pyrrolidone (VP), 0.022 gram N-vinyl-3(E)-ethylidene pyrrolidone (EVP), 21.6 grams of distilled water and 0.07 gram of tert-butylperoxy pivalate (LUPERSOL 11) is poured into a Petri dish and the dish placed under a blanket of nitrogen in a temperature controlled oven under atmospheric pressure. The solution in this closed system is heated at 65° C. for 3 hours and then at 120° C. for one hour, after which the solution is allowed to cool to room temperature and the resulting rubbery product was then removed from the dish and was introduced into about 200 volumes of distilled water for 15 hours with simultaneous removal and replacement of the water until the mother liquor is free of residual monomer and soluble, non-crosslinked poly-(N-vinylpyrrolidone). During the above water digestion step, the rubbery product swells to a clear, transparent hydrogel having a gel volume of 18 g. $H_2O$ per g. of crosslinked polymer. This preshaped hydrogel was then subjected to freeze drying at $-80°$ C. for 15 hours, after which it was allowed to warm to room temperature. The resulting rigid cellular product is a foamed, light weight, compressible, crosslinked polymer which is suitable for insulation or other purposes requiring temperature insulating properties.

EXAMPLE 7

Example i is repeated except that the homogeneous solution is poured into a drinking cup mold. The freeze dried, foamed product recovered has good mechanical strength, and thermoinsulating properties.

EXAMPLE 8

Example 7 is repeated except that 0.002 gram of an innocuous blue colorant is added to the homogeneous solution. This freeze dried foamed product is an attractive disposable drinking cup.

EXAMPLE 9

Example 2 is repeated except that the EVP in the monomer mixture of EVP/VP is replaced with EBVP (divinylimidazolalone). The resulting foamed product is similar to that produced in Example 2.

EXAMPLE 10

Example 2 is repeated except that the procedure of the homogeneous solution poured into the Petri dish is 9.7 grams of a 50/50 mixture of VP and N-vinylcaprolactam, 0.02 g. of EBVP, 40 grams of distilled water and 0.15 g. of t-butyl peroctate. The resulting foamed product is similar to that obtained in Example 2.

What is claimed is:

1. A foamed, cellular 0.01 to 10% polyalkenyl crosslinked N-vinyl-lactam polymer in a rigid, molded water non-swellable form.

2. The foamed polymer of claim 1 which is N-vinyl-2-pyrrolidone and/or N-vinyl caprolactam crosslinked with 1-vinyl-3(E)-ethylene pyrrolidone.

3. The foamed polymer of claim 1 which is N-vinyl-2-pyrrolidone and/or N-vinyl caprolactam crosslinked with ethylene-his (N-vinylpyrrolidone).

4. The foamed polymer of claim 1 which is N-vinyl-2-pyrrolidone and/or N-vinyl caprolactam crosslinked with divinylimidazolidone.

5. The foamed polymer of claim 1 wherein said polymer is crosslinked N-vinylpyrrolidone homopolymer.

6. The foamed polymer of claim I wherein said polymer is crosslinked N-vinylpyrrolidone/N-vinyl caprolactam copolymer.

7. The foamed polymer of claim 1 wherein said polymer is crosslinked N-vinylpyrrolidone/vinyl acetate copolymer.

8. The foamed polymer of claim 1 wherein said polymer is crosslinked N-vinylpyrrolidone/acrylic acid copolymer.

9. The foamed polymer of claim 1 wherein said polymer is crosslinked N-vinylcaprolactam homopolymer.

10. The polymer of claim i wherein the pores of the cellular polymer structure have an average diameter between about 1 and about 100 microns.

* * * * *